(12) United States Patent
Ooi et al.

(10) Patent No.: US 8,305,725 B2
(45) Date of Patent: Nov. 6, 2012

(54) CURRENT LIMITING APPARATUS AND METHOD

(75) Inventors: Thean Song Ooi, Taman Desa Relau II (MY); Macwien Krishnamurthi, Shah Alam (MY); Kow Chee Chong, Bayan Lepas (MY); Poh Haut Low, Bukit Mertajam (MY)

(73) Assignee: Motorola Solutions, Inc., Schaumburg, IL (US)

( * ) Notice: Subject to any disclaimer, the term of this patent is extended or adjusted under 35 U.S.C. 154(b) by 665 days.

(21) Appl. No.: 12/545,257

(22) Filed: Aug. 21, 2009

(65) Prior Publication Data

US 2011/0045323 A1 Feb. 24, 2011

(51) Int. Cl.
H02H 5/00 (2006.01)
(52) U.S. Cl. ........................................................ 361/103
(58) Field of Classification Search .................. 361/103, 361/93.1
See application file for complete search history.

(56) References Cited

U.S. PATENT DOCUMENTS

| | | | |
|---|---|---|---|
| 4,992,340 A | 2/1991 | Tidwell et al. | |
| 5,218,284 A | 6/1993 | Burns et al. | |
| 5,335,133 A | 8/1994 | Bishop et al. | |
| 5,569,550 A | 10/1996 | Garrett et al. | |
| 5,576,612 A | 11/1996 | Garrett et al. | |
| 5,602,460 A | 2/1997 | Fernandez et al. | |
| 5,604,415 A | 2/1997 | Vashi et al. | |
| 5,864,458 A | 1/1999 | Duffy et al. | |
| 5,963,019 A | 10/1999 | Cheon | |
| 6,429,622 B1 * | 8/2002 | Svensson | 320/106 |
| 6,522,361 B2 * | 2/2003 | Higuchi et al. | 348/372 |
| 6,522,902 B2 * | 2/2003 | Nishihara et al. | 455/574 |
| 6,789,205 B1 | 9/2004 | Patino et al. | |
| 6,879,133 B1 * | 4/2005 | Geren | 320/134 |
| 7,808,205 B2 * | 10/2010 | Rao et al. | 320/106 |
| 8,143,858 B2 * | 3/2012 | Tsugawa et al. | 320/134 |
| 2002/0079865 A1 | 6/2002 | Thomas et al. | |

FOREIGN PATENT DOCUMENTS

KR 100838718 B1 6/2008

OTHER PUBLICATIONS

European Standard—EN60950-1—Information Technology Equipment Safety—Part 1: General Requirements (IEC 60950-1:2005, modified)—Apr. 2006—3 pages (cover page, pp. 71-72).
International Search Report and Written Opinion for International Application No. PCT/US10/42985 mailed on Mar. 3, 2011.
English language Abstract of KR Patent Publication No. KR100838718, European Patent Office, espacenet database—Worldwide (2003).

* cited by examiner

*Primary Examiner* — Stephen W Jackson
(74) *Attorney, Agent, or Firm* — Barbara R. Doutre (57) ABSTRACT

A battery pack (200) includes a power limiting apparatus (230) comprising a power limiting resistor (232) in series with an overcurrent protection device (234). A switch (236) under the control of a data line (202) is placed in parallel with the series coupled power limiting resistor (232) and overcurrent protection device (234). When the switch (236) is enabled via the data line (202), current limiting is provided via the switch and a fuse. When the switch (236) is disabled via the data line (202) current limiting is provided via the overcurrent protection device (234) which limits the maximum battery system current.

22 Claims, 7 Drawing Sheets

CURRENT LIMITING APPARATUS AND METHOD

FIELD OF THE DISCLOSURE

The present disclosure relates generally to a communication devices and more particularly to power limiting of power sources used in such communication devices.

BACKGROUND

Due to rapid advances in technology, there is an increasing number of portable communication devices used in a variety of environmental conditions. Since portable communication devices necessarily use a battery or batteries for operation, there exists the possibility of a spark being generated when the battery or batteries are removed and replaced. Accidental occurrences of short circuits or soft shorts of external battery contacts may also be sufficient to create hot spots with the potential to cause sparking problems in the field. When a portable communication device is used in certain locations, structures, or buildings having highly combustible environmental conditions it is imperative to avoid any sparking between the device and the battery that might result in an explosion and/or a fire.

Product safety directives have been established under various agencies and standards, such as Information Technology Equipment (ITE) Safety Standards (e.g. section 60950-1 covers limited power sources), Factory Mutual (FM) and ATmosphere EXplosible (ATEX), to address product safety. Devices operating under these directives or standards are also referred to as intrinsically safe devices. When developing an intrinsically safe electronic device for today's portable communication device market, a designer must provide a safe device while addressing the challenges of parts count, board space and ease of manufacturability.

Accordingly, it would be highly desirable to have an improved battery for use with an electronic device that ensures product safety using few components, taking up little board space and facilitating manufacturing.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Before describing in detail embodiments that are in accordance with the present invention, it should be observed that the embodiments reside primarily in combinations of method, steps and components related to power limiting within a battery pack used for powering a host electronic device, such as a portable battery powered radio or the like. Briefly, the power limiting apparatus comprises a power limiting resistor in series with a positive temperature coefficient (PTC) device. The power limiting resistor limits the maximum battery system current so that a fuse within the battery pack remains within its rated limits. The PTC device has a predetermined trip current threshold which holds the current at a predetermined level thereby allowing the load current needed for initialization activity of the host device.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
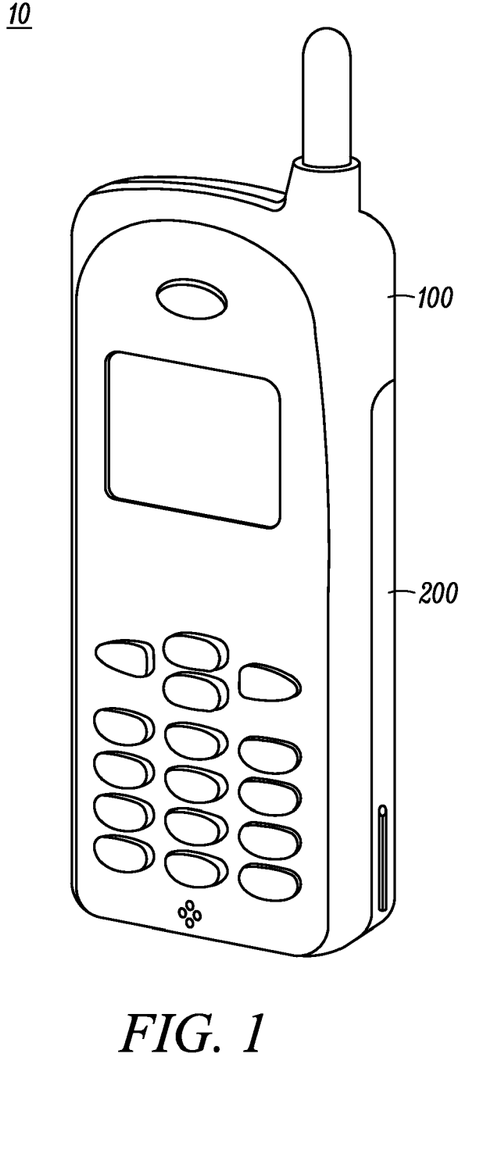
FIG. 1 is a battery operated portable electronic device formed in accordance with some embodiments.
Figure 2:
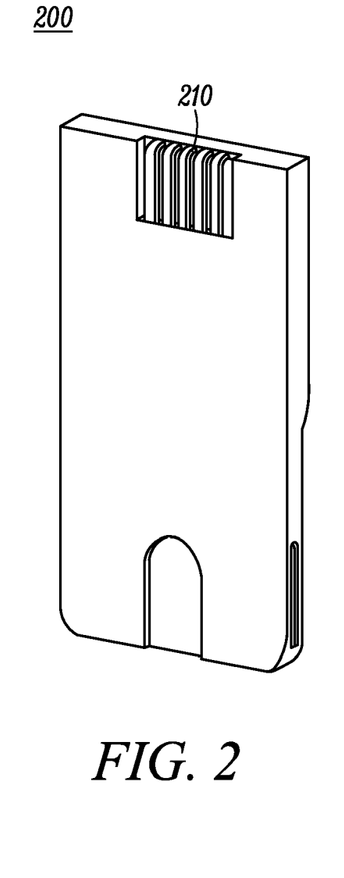
FIG. 2 is a battery pack formed in accordance with some embodiments.

FIG. 1 is a battery operated portable electronic device 10 formed in accordance with an embodiment of the invention. Portable electronic device 10 may comprise for example, a portable radio, a portable computer, or any other transportable host device powered from a rechargeable battery. For the purposes of this application, battery operated portable electronic device 10 will be described in terms of a portable radio 100 having electronics enclosed therein and a battery pack 200 having battery electronics enclosed therein. The battery pack 200 is removably coupled to the radio 100. A plurality of battery pack terminals 210 provide electrical contact with corresponding radio contacts of the portable radio 100. In accordance with the embodiment, a power limiting circuit is provided within the battery pack 200 which limits the maximum battery current via the use of a power limiting resistor and PTC device. The power limiting circuit eliminates potential sparking occurring between the battery terminals and the radio contacts during engagement and disengagement of the battery pack 200 to and from the portable radio 100.

Figure 3:
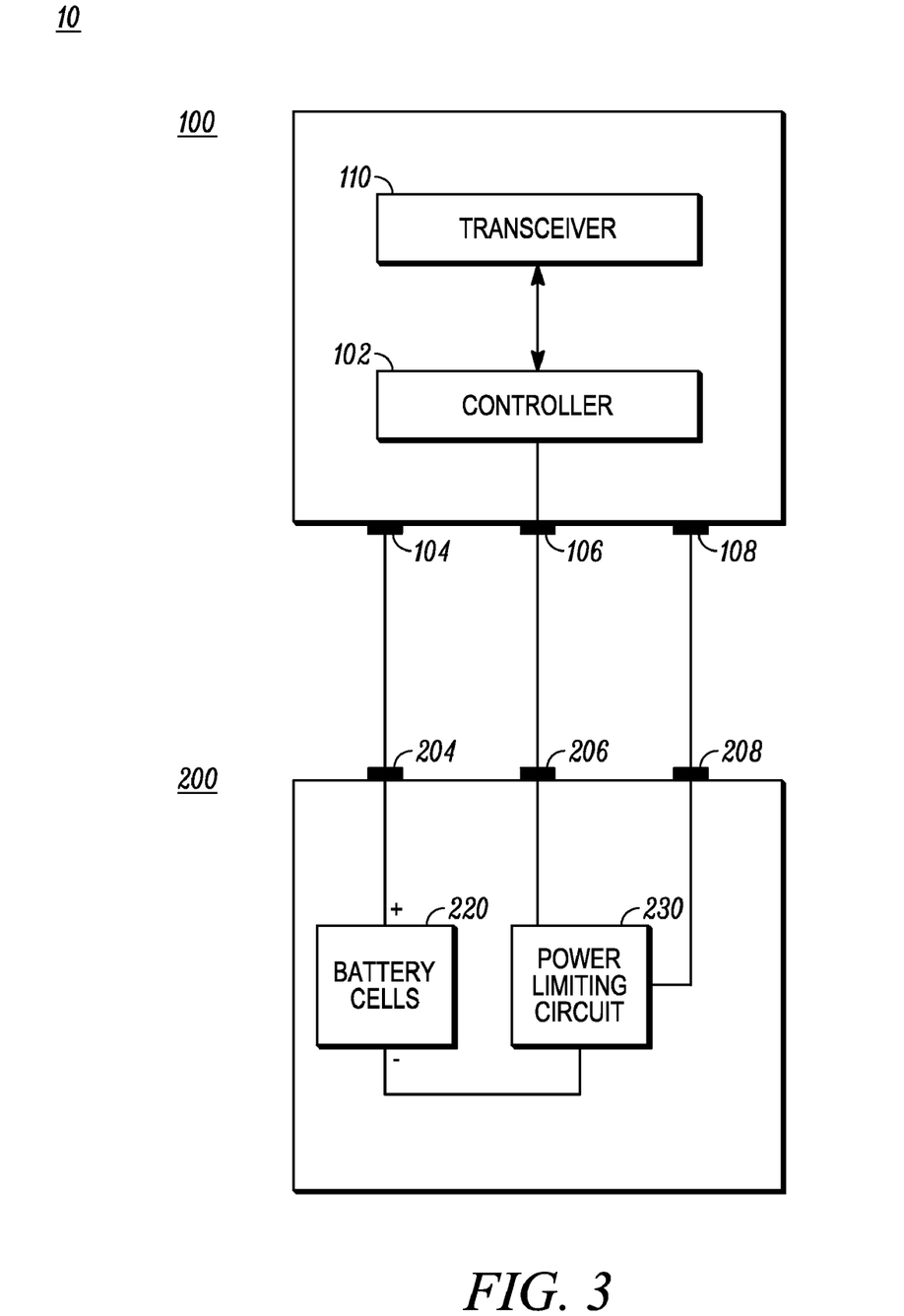
FIG. 3 is a block diagram of a battery powered electronic device in accordance with some embodiments.

Referring to FIG. 3, a block diagram of the battery operated portable electronic device 10 in which radio 100 comprises electronics including a transceiver section 110 and controller section 102. The controller section 102 includes a microprocessor and may further include or have coupled thereto a memory device which contains data capable of being accessed. The memory device is preprogrammed by the manufacturer to include a number of different operating parameters and/or operating characteristics for the overall operation of electronic device 10.

Electrical and mechanical coupling occur upon positive radio contact 104 mating with positive battery terminal 204; data contact 106 mating with data terminal 206; and radio ground potential contact 108 mating with battery ground terminal 208.

The battery pack 200 includes a battery cell or a plurality of battery cells 220, such as Nickel, Nickel-Cadmium, or Lithium ion chemistries to name a few. In accordance with the various embodiments, a power limiting circuit 230 is coupled between the battery cells 220 and battery pack ground terminal 208. The power limiting circuit 230 is enabled and disabled in response to input received from the radio over data contact 106 and data terminal 206.

Figure 4:
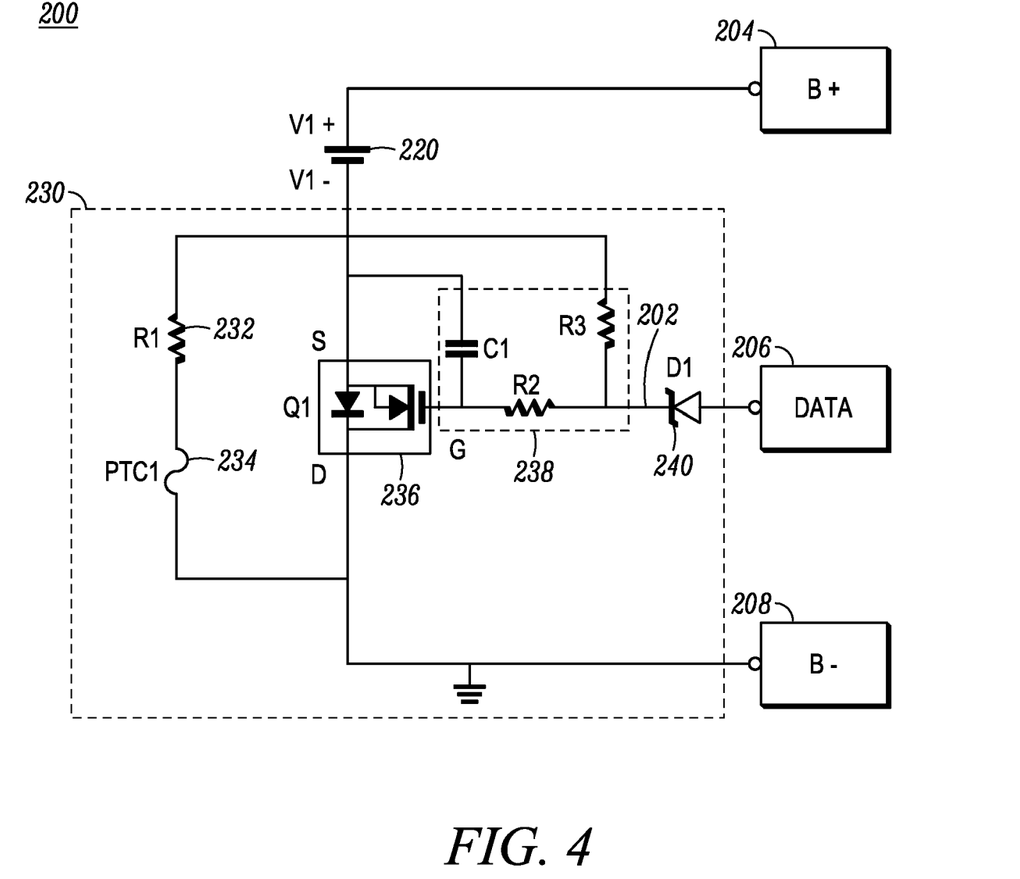
FIG. 4 is a power limiting circuit formed in accordance with some embodiments.

Referring to FIG. 4, there is shown the battery pack 200 having power limiting circuit 230 formed in accordance with an embodiment of the invention. Power limiting circuit 230 includes a power limiting resistor 232 in series with a positive temperature coefficient (PTC) device 234. The power limiting resistor 232 limits the maximum battery system current in order to protect a fuse (shown in later view) within the battery pack 200.

The PTC device 234 is a current interrupting device, also referred to as an overcurrent protection device, made of materials that experience an increase in electrical resistance with increased temperature. Materials which have useful engineering applications usually show a relatively rapid increase with temperature, i.e. a higher coefficient. The higher the coefficient, the greater the increase in electrical resistance for a given temperature increase. PTC resistors for use as overcurrent protectors are available with normal conduction mode resistances of about 0.04 ohms. This resistance is significantly lower than devices made from previously available barium titanate ceramics. These overcurrent protectors are made from conductive polymer compositions and behave like solid-state circuit breakers or resettable fuses.

The hold current of power limiting circuit 230 is determined upon the selection of PTC device 234. The PTC device 234 is selected to have a predetermined trip current threshold which conducts the load current needed for initialization of the radio. A semiconductor switch (Q1) 236, preferably an N-channel field effect transistor (FET) 236, has its source to drain coupled in parallel to the series coupled power limiting resistor 232 and PTC device 234. The FET gate is controlled by data terminal 206 over a data line 202. Current should not be sourced from the data line 202, and as such a FET, since it is mainly voltage driven, is the most suitable device for the power limiting circuit 230. The use of a bipolar transistor would not be desirable as it would require drive current from the data line 202. Data line 202 is used to receive and transfer data as a host/battery data line.

When the radio 100 is switched off or the battery pack 200 is removed from the radio, the switch Q1 236 will switch off, thereby allowing the series power limiting resistor 232 and PTC device 234 to be engaged to ensure power limiting.

When the radio 100 having the battery pack 200 coupled thereto is switched on, switch Q1 236 is turned on from an enable signal provided by the radio to data line 202. When turned on, the switch 236 basically provides a short circuit across the series power limiting resistor 232 and PTC device 234 and as such the power limiting resistor and PTC device are bypassed. During normal radio operation with normal operational load currents the power limiting resistor 232 and PTC device 234 remain bypassed.

A restive-capacitive (RC) delay circuit 238, configured to have a predetermined minimum voltage holding time, ensures that the holding voltage is present in the event of a radio-battery communication through the data line 202. This ensures normal circuit operation during host-battery communication and data line input interruptions if any. For the N-channel FET configuration, the delay circuit 238 comprises a voltage divider R2, R3 and capacitor C1 coupled between the gate and source of the FET. The placement of a diode 240 between the data terminal 206 and the RC delay circuit 238 ensures that the holding voltage does not bleed through the radio's data line.

Figure 5:
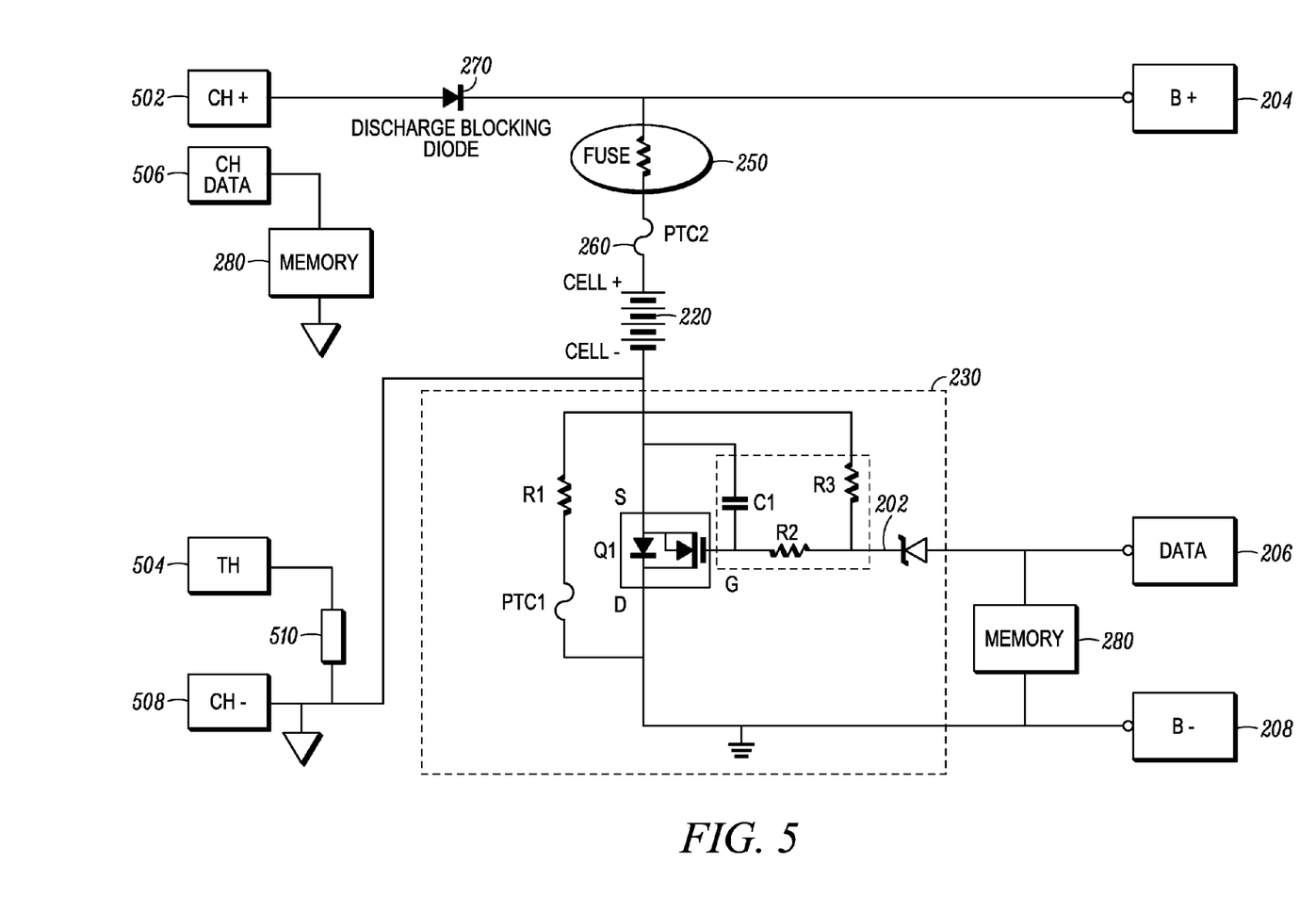
FIG. 5 is a battery pack incorporating the power limiting circuit in accordance with some embodiments.

FIG. 5 shows the power limiting circuit 230 incorporated within a battery pack in accordance with an embodiment of the invention. Battery pack 200 includes radio/battery interconnect terminals as noted previously: positive terminal (B$^+$) 204, data terminal 206 and ground/negative terminal (B$^-$) 208. Battery pack 200 further includes charging interconnect terminals including positive charge terminal (CH$^+$) 502, thermistor terminal (TH) 504, charge data (CH data) terminal 506, and negative charge terminal (CH$^-$) 508. The battery pack 200 includes a discharge blocking diode 270 coupled between the positive charge terminal 502 and positive battery terminal 204 with the diode's anode coupled to CH+ and its cathode coupled to the battery terminal (B$^1$)204. A fuse 250 and PTC2 device 260 are coupled in series coming off of the cathode of diode 270. Fuse 250 is selected with a predetermined rating, such as for example a 5 A slow blow fuse. The purpose of the fuse 250 is to permanently open circuit the battery pack 200 should an accidental short circuit be imposed between the positive terminal 204 to the ground terminal 208 of the pack. The PTC2 device 260 is selected to be sufficient to support electronic device initialization activities. For example PTC2 device 260 may be a polyswitch that only allows approximately 0.35 A. If the battery pack 200 is not attached to the radio, and the pack is imposed with an accidental soft short circuit below the fuse's current rating, then the PTC2 device 260 will open circuit, thereby limiting the power out of the battery pack 200 and protecting the fuse 250.

Also within the battery pack 200 are a plurality of battery cells 220 coupled in series and having a positive end coupled to the PTC2 device 260 and a negative potential end coupled to the power limiting circuit 230 at the source of the switch Q1 236. Also included within the battery pack 200 are thermistor 510 coupled to the plurality of battery cells 220 for monitoring battery temperature.

Memory 280 is preferably an erasable programmable read-only memory (EPROM) chip, but other suitable memory may be used as well. Memory chip 280 is located in the battery pack 200 and is coupled to the data line 202 and charge data terminal 506. Portable radio 100 captures battery data from memory 280, and the radio provides the voltage (e.g. 5V) through data line 202 for the memory 280 to have its power. Portable radio 100 reads the data in the memory 280 by pulling down the data line 202 momentarily. In accordance with an embodiment of the invention, the battery data line is also used to control the FET for the purpose of power limiting. Alternatively, any voltage line from the radio to the battery that is used to determine, monitor, or provide feedback of any battery information can also be coupled for the purpose of enabling disabling the power limiting application of power limiting circuit 230.

Figure 6:
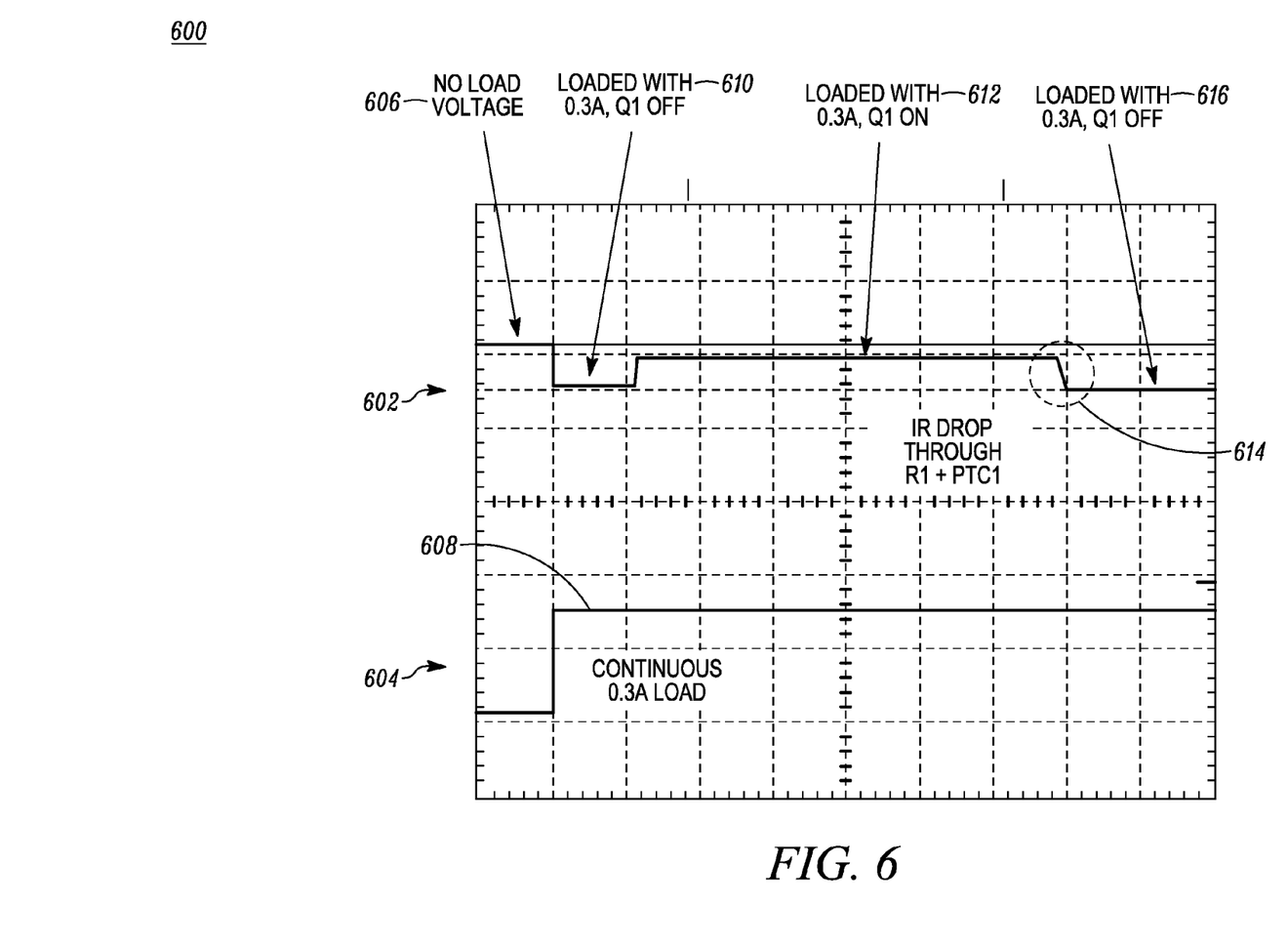
FIG. 6 is an example of a graph of the power limiting circuit operating in accordance with a host initialization embodiment.
Figure 7:
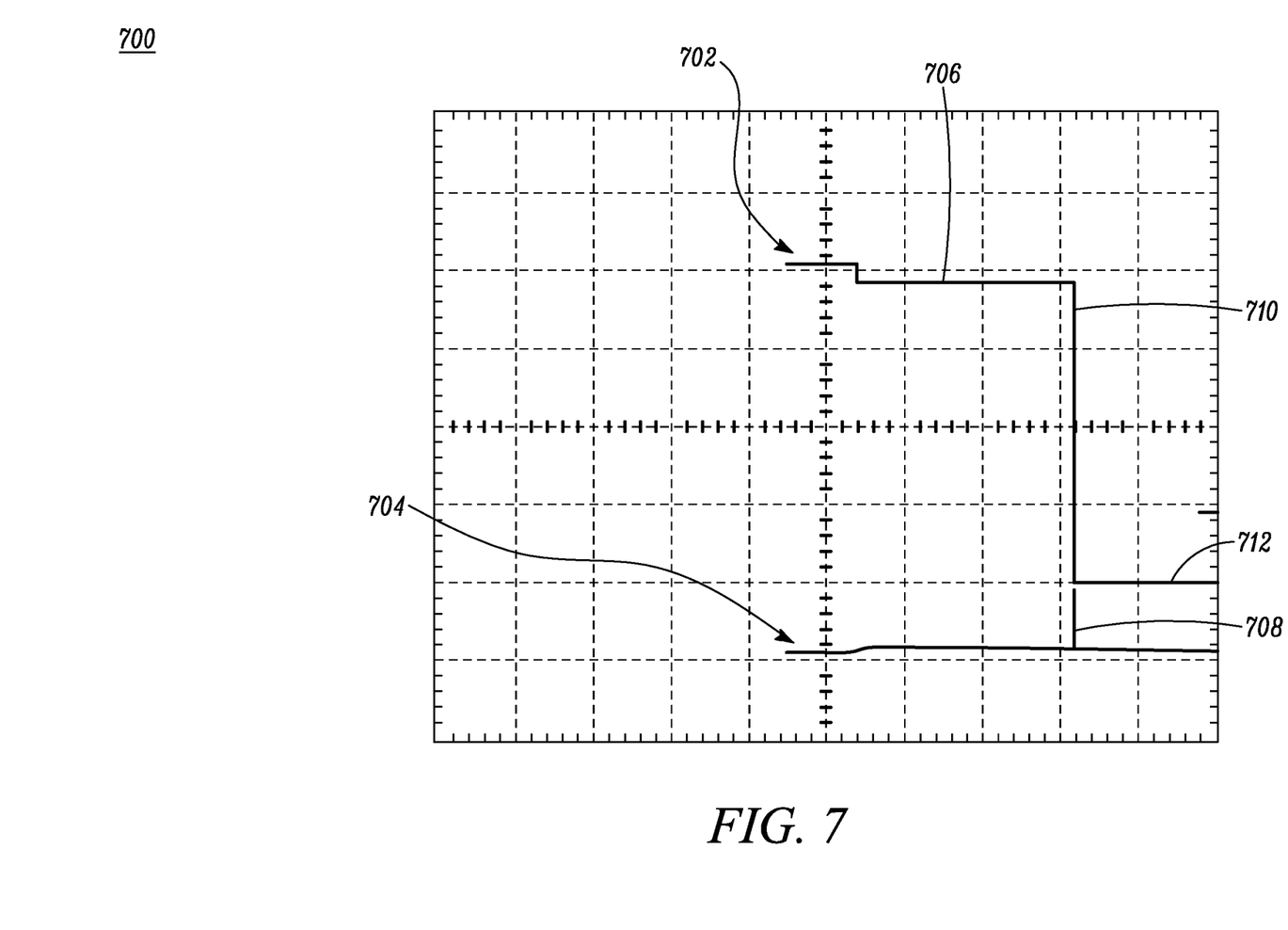
FIG. 7 is an example of a graph of the power limiting circuit operating in accordance with a current overload embodiment.

The following Table provides an example of a listing of part values for the power limiting circuit 230 providing power limiting to two lithium (Li) ion cells (two 3.7V nominal voltage cells) for use in a two-way radio application. Alternatively, nickel (Ni) based batteries (six 1.2V nominal voltage cells) could also be used. The graph of FIG. 6 showing host/radio initialization and the graph of FIG. 7 showing overload testing are provided as examples to describe the functionality of the power limiting circuit 230. The Table and graphs provided by FIGS. 6 and 7 are provided for exemplary purposes only, and it is understood that component values may be selected based on the current and voltage requirements for a specific application.

| Reference Designator | Component | Description |
| --- | --- | --- |
| 234 | PTC | 0.35 A Polymer switch device |
| 232 | R1 | 1.2 ohm, 1 Watt resistor |
| 236 | Q1 | Mosfet 30 V |
| 240 | D1 | Schottky diode, 30 V, 02. W |
| 238 | C1 | 0.22 μF, 50 V |
| 238 | R2, R3 | Ceramic chip resistor 1.0 Mohm |
| 220 | Cell | Lithium ion 3.7 V (two in series) |

Referring to graph 600 of FIG. 6, a loading test was performed to simulate host initialization. The upper data line 602 represents the voltage drop being measured across the source and drain of the FET 236. The drain of the FET is used as the reference. The lower data line 604 represents load current applied across the positive battery pack terminal 204 and negative battery pack terminal 208. The no load voltage with switch Q1 236 switched on is represented by designator 606. As a continuous load of 0.3 Amps is applied across positive and negative battery pack terminals 204, 208, as represented by designator 608, the switch Q1 remains off and a voltage drop occurs across power limiting resistor (R1) 232 and PTC device 234 as seen at designator 610. As Q1 236 turns on (in response to data on the radio data line 202) a short is created across the Q1 236 shorting out power limiting resistor (R1) 232 and PTC device 234 and so the voltage goes high as seen by designator 612. Current flows through shorted Q1 236 and a voltage drop occurs at the divider of delay circuit 238. As Q1 236 turns off (in response to the data line being pulled low), a delay occurs as indicated by designator 614 which allows capacitor C1 of delay circuit 238 to hold the voltage for a predetermined about of time. The voltage drop across power limiting resistor (R1) 232 and PTC device 234 is represented by designator 616 and only drops by a very small amount thereby "holding" the voltage by capacitor C1 of delay circuit 238. Graph 600 demonstrates that the power limiting circuit 230 in this example has holding current greater than 0.3 Amps at Q1 236 off. When Q1 236 is on, current flows through Q1 236. When Q1 236 is off, current flows through power limiting resistor (R1) 232 and PTC device 234. The Q1 gate is controlled by the data line 202. When the host with battery is switched off or the battery is removed from the host, the Q1 switches off, thereby allowing the power limiting resistor (R1) 232 and PTC device 234 to limit current. After radio initialization and in normal operation, the voltage from the radio data line switches on Q1 236, thereby bypassing R1 232 and PTC device 234. During normal operation capacitor C1 holds the gate voltage of Q1 236 to maintain its on state in the event that the data line 202 is pulled low momentarily during radio battery communication. Capacitor C1 and resistors R2 and R3 of delay circuit 238 provide the time constant for the hold voltage during the momentary interruption. Diode (D1) 240 ensures that capacitor C1 does not discharge through the data line 202 during the momentary pull low period for data communication.

FIG. 7 shows graph 700 representing an overload test with Q1 236 turned off. Designator 702 represents the voltage measured at the battery terminal 204, 208 as a current load (designator 704) was applied to the positive and negative battery pack terminals 204, 208. The test was done with the battery loaded with a 0.1 Amp load current (across positive and negative battery pack terminals 204, 208) and then increased to 4 Amps (designator 708), thereby activating the PTC device 234. This increase in current simulated a sparking condition at the battery terminals. The testing was conducted in accordance with the testing requirements under ITE EN60950-1 Limited Power Source standard. The voltage measured at the battery terminals 204, 208 dropped (designator 710) and remained pulled low (designator 712) while Q1 236 remained off. The PTC device 234 interrupted the overload current in the power limiting circuit 230. With the 4 Amps load current, the PTC device 234 tripped within 18 ms. Additional overload current tests taken with Q1 off showed that with a 2 Amp load current the PTC device 234 tripped within 30 ms. With Q1 236 off, an 8 Amp load current caused the PTC device 234 to trip in 18 ms. With Q1 236 off, a complete short across the positive and negative battery pack terminals 204, 208 caused the PTC device 234 to trip in 15 ms. Once the short circuit to the positive and negative battery pack terminals 204, 208 is removed, the PTC device 234 resets.

Basically the above testing verifies that power limiting resistor (R1) 232 and PTC device 234 are bypassed except when the data line 202 switches Q1 236 off in response to initialization or an overcurrent condition being sensed at the contacts. With Q1 turned off the series coupled R1/PTC is able to limit current thereby protecting the fuse so that it remains within its rated limits and avoiding sparking. During regular operation, the switch Q1 236 is switched on and the series coupled R1 232 and PTC device 234 are bypassed.

Figure 8:
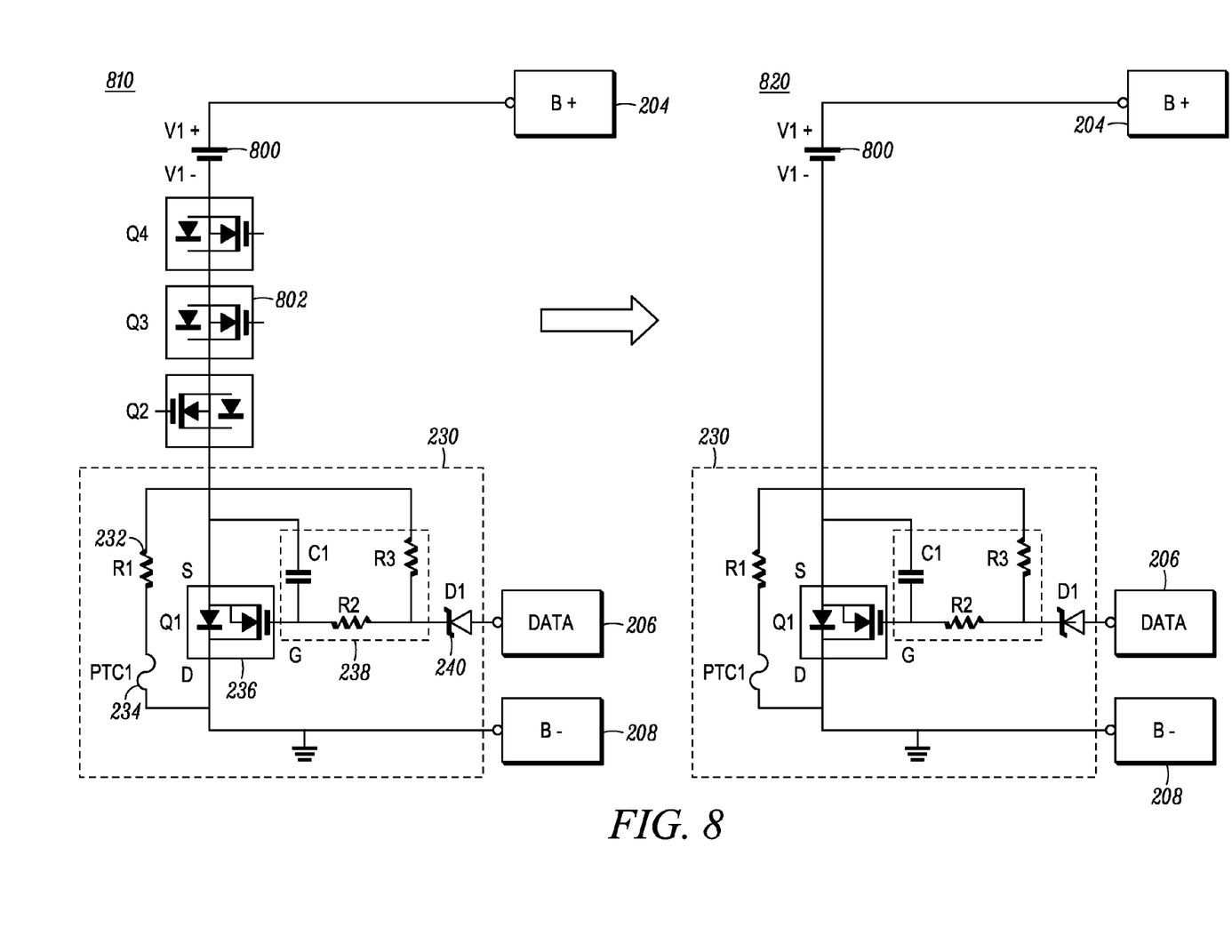
FIG. 8 shows the power limiting circuit incorporated within another battery pack in accordance with some embodiments.

FIG. 8 shows the power limiting circuit 230 implemented in another battery pack configuration using lithium ion cells 800. The battery pack 810 includes transistor FETs Q2, Q3, Q4 802 which turn on during normal operation and can be considered shorted as seen in 820. The PTC device 234 provides a hold current for host initialization. The hold current is based on the PTC's hold current specification. Values of components are selected based on the voltage and current conditions requirements for the battery cell(s) and host device. The power limiting resistor 232 and PTC device 234 provide a resistance for maximum current limiting. After radio initialization and in normal operation, the voltage from the radio data line switches on the switch Q1 236, thereby bypassing power limiting resistor (R1) 232 and PTC device 234. Capacitor C1 holds the gate voltage of switch Q1 236 to maintain an on state in the event that the data line 202 is pulled low momentarily during radio battery communication. Hence, the capacitor holding voltage is maintained for predetermined amount of time such that variations on the data terminal input can occur without impact the holding voltage. Capacitor C1 and resistors R2 and R3 of delay circuit 238 provide the time constant for the hold voltage during the momentary interruption. Diode D1 240 ensures that capacitor C1 does not discharge through the data line 202 during the momentary pull low period for data communication.

The power limiting circuit formed in accordance with the embodiments is applicable to all known cell chemistries, such as alkaline cells, Li polymer, Li Manganese, and sealed Lead (Pb) acid, to name a few. Basically if power limiting is needed, the power limiting circuit formed in accordance with the embodiments is configurable to the needed topology. A user of an electronic device having a battery pack incorporating the power limiting circuit formed in accordance with the embodiments is thus able to change from one battery pack (having one cell chemistry) to another battery pack (having a different cell chemistry) as the circuit is independent of battery chemistry.

The power limiting of the various embodiments can be summarized in a few steps. Power limiting is achieved by bypassing a semiconductor switch and limiting current though a series coupled power limiting resistor and PTC device in response to the semiconductor switch being bypassed (turned off) during engagement and disengagement of the battery pack from an electronic device. In response to the battery being engaged to the radio for a predetermined amount of time (indicating normal operation) current limiting occurs through the fuse and semiconductor switch (turned on) of the battery causing the series coupled power limiting resistor and PTC device to be bypassed. Applying a delay to the semiconductor switch while the semiconductor switch limits current via the fuse during initialization and normal operation of the electronic device provides the ability to hold a voltage for normal battery powered electronic device operation.

Accordingly, there has been provided a battery pack with very few components as compared to prior approaches. The power limiting can be implemented in legacy battery packs as well as new battery packs with no changes in software. The battery pack formed in accordance with the embodiments provides excellent protection against radio frequency (RF) interference and electrostatic discharge (ESD) with very few components while eliminating the need for any independent RFI or ESD protection integrated circuit (IC). The implementation of the battery pack with fewer components allows for improved real estate usage on the substrate, such as printed circuit board (PCB), flex, to name a few. The use of fewer components and improved real estate usage provides the benefit of a lower cost battery pack with improved ease of manufacturability.

The power limiting circuit, formed in accordance with the embodiments and with appropriate component value selection, complies with the ITE EN60950-1 Limited Power Source standard. The standard includes testing under an application of simulated faults. The limited power source formed in accordance with the embodiments remains inherently limited at the output such that impedance limits and overcurent protective devices and the output are limited in compliance with the standard. Hence, product safety requirements can be met using the power limiting circuit formed in accordance with the various embodiments.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A rechargeable battery pack, comprising:
   a battery cell within the rechargeable battery pack;
   a plurality of terminals coupled to the rechargeable battery pack, including a positive terminal, a negative terminal and a data terminal;
   a power limiting circuit coupled to the battery cell, the power limiting circuit comprising:
      a semiconductor switch coupled to the battery cell and the negative terminal;
      a power limiting resistor and overcurrent protection device coupled in series between the battery cell and the negative terminal in parallel with the semiconductor switch; and
      a delay circuit coupled between the data terminal and the semiconductor switch, wherein the delay circuit comprises a voltage divider and capacitor, the capacitor holding a voltage for a predetermined amount of time such that variations on the data terminal do not impact the holding voltage.

2. The rechargeable battery pack of claim 1, wherein:
   the series coupled power limiting resistor and overcurrent protection device limit current in response to the semiconductor switch being turned off; and the semiconductor switch in response to being turned on limits current via a fuse, thereby bypassing the power limiting resistor and overcurrent protection device.

3. The rechargeable battery pack of claim 1, further comprising a diode coupled between the delay circuit and the data terminal.

4. A rechargeable battery pack, comprising:
a positive terminal, a negative terminal and a data terminal coupled to the rechargeable battery pack;
a battery having positive and negative ends located inside of the battery pack;
a power limiting resistor coupled to the negative end of the battery;
a positive coefficient temperature (PTC) device coupled in series with the power limiting resistor;
a field effect transistor (FET) coupled in parallel to the series coupled power limiting resistor and PTC device, the FET being under control of a data terminal for switching the FET on and off, when the FET is turned off the series power limiting resistor and PTC device provide power limiting, when the FET is turned on the series connected power limiting resistor and PTC device are bypassed;
a resistive capacitive (RC) delay circuit coupled to the FET, the RC delay circuit having a predetermined minimum voltage holding time; and
a diode coupled between the RC delay circuit and the data terminal.

5. The rechargeable battery pack of claim 4, wherein the PTC device comprises a conductive polymer resistor.

6. The rechargeable battery pack of claim 4, wherein the FET is an N-channel FET.

7. The rechargeable battery pack of claim 4, wherein the rechargeable battery pack further comprises a thermistor operatively coupled to the battery.

8. The rechargeable battery pack of claim 7, wherein the rechargeable further comprises a memory operatively coupled to the thermistor and the data terminal.

9. The rechargeable battery pack of claim 8, further comprising: a fuse and another PTC device coupled in series to the positive end of the battery, the fuse being coupled to the positive terminal of the rechargeable battery pack.

10. The rechargeable battery pack of claim 9, further comprising a second diode coupled to the positive terminal of the rechargeable battery pack and to the fuse.

11. A portable electronic device, comprising:
a battery pack removably coupled to the portable electronic device, the battery pack comprising:
a positive terminal having a discharge blocking diode and a fuse coupled thereto;
a first PTC device coupled to the fuse;
a plurality of battery cells coupled in series to the first PTC device;
a data terminal;
a ground terminal;
an N-channel FET having a source coupled to the plurality of battery cells and a drain coupled to the ground terminal;
a power limiting resistor and second PTC device coupled in series, the series coupled power limiting resistor and second PTC device coupled in parallel across the N-channel FET;
an RC delay circuit coupled between the source and gate of the N-channel FET; and
a second discharge blocking diode coupled between the data terminal and the RC delay circuit.

12. The portable electronic device of claim 11, wherein the series coupled power limiting resistor and second PTC device provide current limiting to the plurality of battery cells.

13. The portable electronic device of claim 12, wherein the RC delay circuit controls turning the N-channel FET on and off in response to data on the data terminal enabling and disabling current limiting of the battery pack.

14. The portable electronic device of claim 13, further comprising:
at the battery pack:
a memory coupled between the data terminal and the ground terminal; and
a thermistor coupled to the plurality of battery cells.

15. The portable electronic device of claim 11, wherein the current limiting is configurable to accommodate various battery cell chemistries.

16. The portable electronic device of claim 11, wherein the portable electronic device comprises a portable battery operated radio.

17. A rechargeable battery pack, comprising:
a battery cell within the battery pack;
a plurality of terminals coupled to the battery pack, including a positive terminal, a negative terminal and a data terminal;
a power limiting circuit coupled to the battery cell, the power limiting circuit comprising:
a semiconductor switch coupled to the battery cell and the negative terminal;
a power limiting resistor and overcurrent protection device coupled in series between the battery cell and the negative terminal in parallel with the semiconductor switch; and
a delay circuit operatively coupled to the data terminal and the semiconductor switch, wherein the delay circuit comprises a voltage divider and capacitor, the capacitor holding a voltage for a predetermined amount of time such that variations on the data terminal do not impact the holding voltage.

18. The rechargeable battery pack of claim 17, wherein:
the series coupled power limiting resistor and overcurrent protection device limit current in response to the semiconductor switch being turned off; and
the semiconductor switch limits current via a fuse in response to being turned on, thereby bypassing the power limiting resistor and overcurrent production device.

19. The rechargeable battery pack of claim 17, further comprising a diode coupled between the delay circuit and the data terminal.

20. The rechargeable battery pack of claim 17, wherein the overcurrent protection device comprises a positive temperature coefficient (PTC) device having a predetermined trip current threshold.

21. A method of power limiting a battery pack, comprising:
during engagement and disengagement of the battery pack from an electronic device:
bypassing a semiconductor switch and limiting current though a series coupled power limiting resistor and positive temperature coefficient (PTC) device in response to the semiconductor switch being bypassed; and
applying a delay circuit to the semiconductor switch while the semiconductor switch conducts current to hold a voltage for normal battery powered electronic device operation.

22. The method of claim 21, further comprising:
limiting current: via a fuse through the semiconductor switch in response to the battery pack being engaged to the electronic device for a predetermined amount of time indicating normal operation of the battery pack and electronic device.

* * * * *

UNITED STATES PATENT AND TRADEMARK OFFICE
CERTIFICATE OF CORRECTION

PATENT NO. : 8,305,725 B2
APPLICATION NO. : 12/545257
DATED : November 6, 2012
INVENTOR(S) : Ooi et al.

It is certified that error appears in the above-identified patent and that said Letters Patent is hereby corrected as shown below:

On the Title Page, below item (73), under "Notice", in Column 1, Line 4, insert -- This patent is subject to a terminal disclaimer. --.

On the Title Page, item (45), under "Date of Patent", in Column 2, Line 1, delete "Nov. 6, 2012," and insert -- *Nov. 6, 2012 --, therefor.

In the Specifications

In Column 3, Line 59, delete "restive-capacitive" and insert -- resistive-capacitive --, therefor.

In Column 4, Line 16, delete "$(B^|)204.$" and insert -- $(B^+)204.$ --, therefor.

In Column 7, Line 33, delete "overcurent" and insert -- overcurrent --, therefor.

In Column 8, Line 37, delete "subject" and insert -- subject. --, therefor.

In the Claims

In Column 9, Line 48, in Claim 11, delete "PTC" and insert -- positive temperature coefficient (PTC) --, therefor.

In Column 9, Line 53, in Claim 11, delete "FET" and insert -- field effect transistor (FET) --, therefor.

In Column 9, Line 60, in Claim 11, delete "RC" and insert -- resistive-capacitive (RC) --, therefor.

In Column 10, Line 12, in Claim 15, delete "is configurable to accommodate various" and insert -- accommodates a plurality of --, therefor.

In Column 10, Line 60, in Claim 22, delete "current:" and insert -- current --, therefor.

Signed and Sealed this
Thirtieth Day of April, 2013

Teresa Stanek Rea
*Acting Director of the United States Patent and Trademark Office*